Sept. 22, 1936.  B. H. ANIBAL  2,054,919
VEHICLE TAIL LAMP MOUNTING
Filed Nov. 5, 1934   3 Sheets-Sheet 1
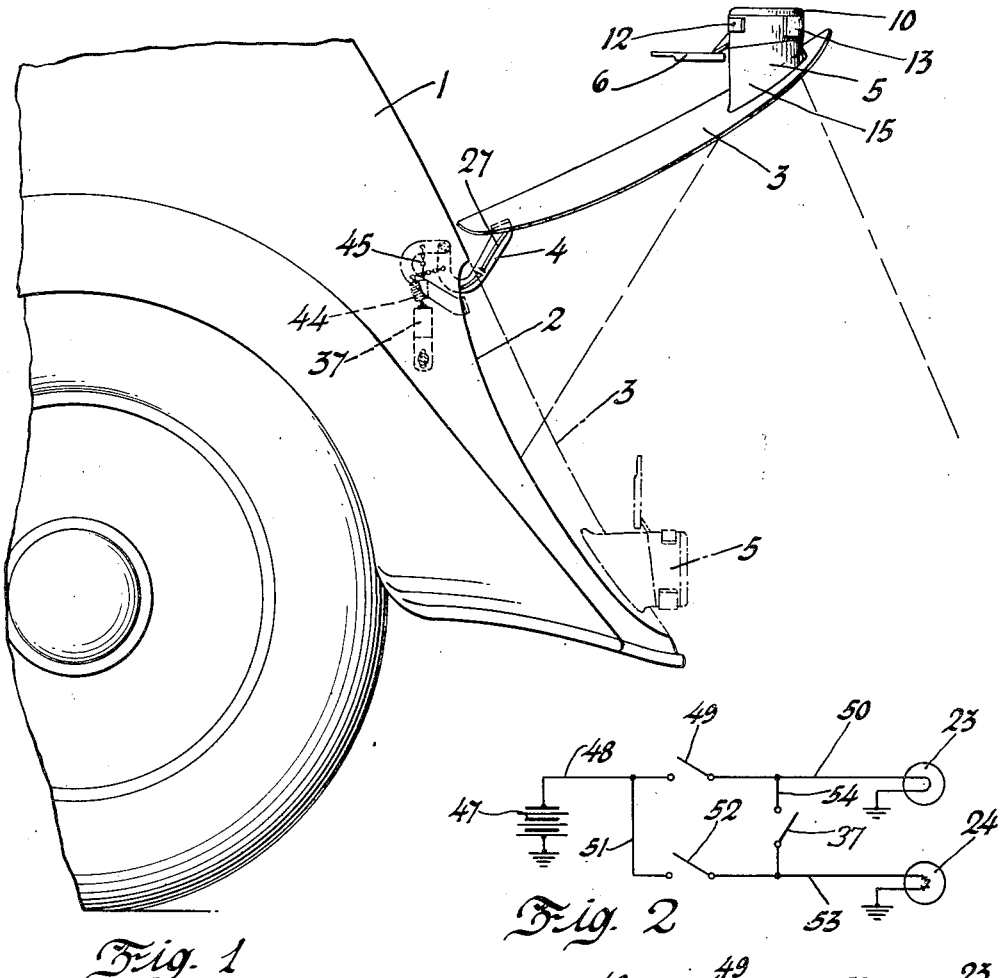
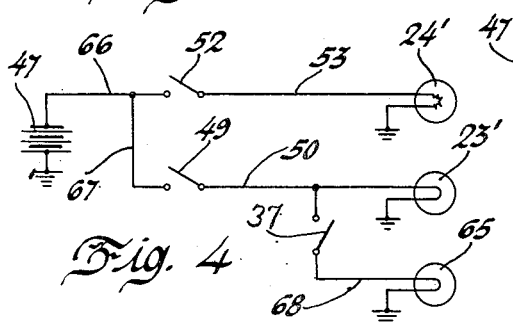
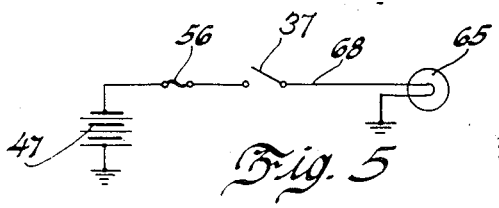
Inventor
Benjamin H. Anibal
By Blackmore, Spence & Flint
Attorneys Sept. 22, 1936.　　　　B. H. ANIBAL　　　　2,054,919
VEHICLE TAIL LAMP MOUNTING
Filed Nov. 5, 1934　　　　3 Sheets-Sheet 2
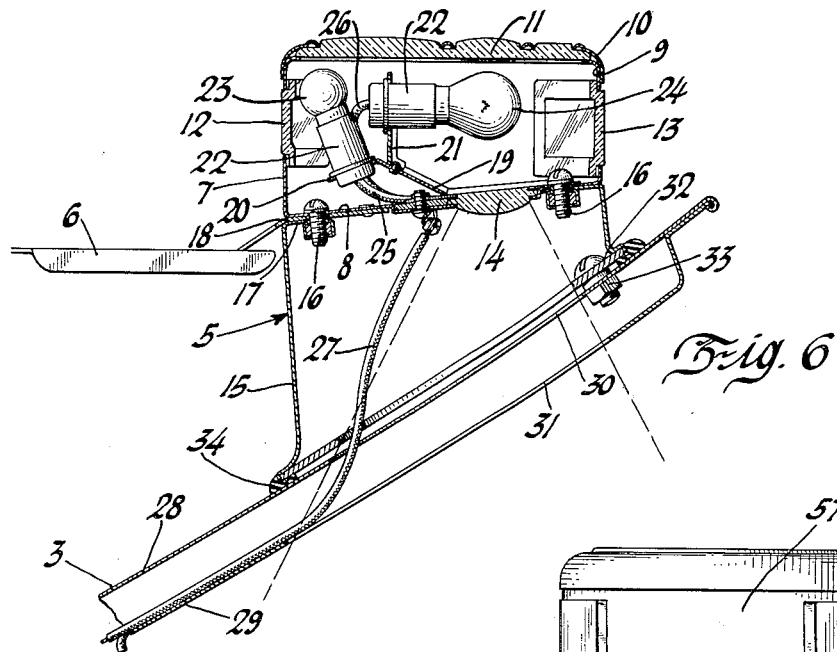
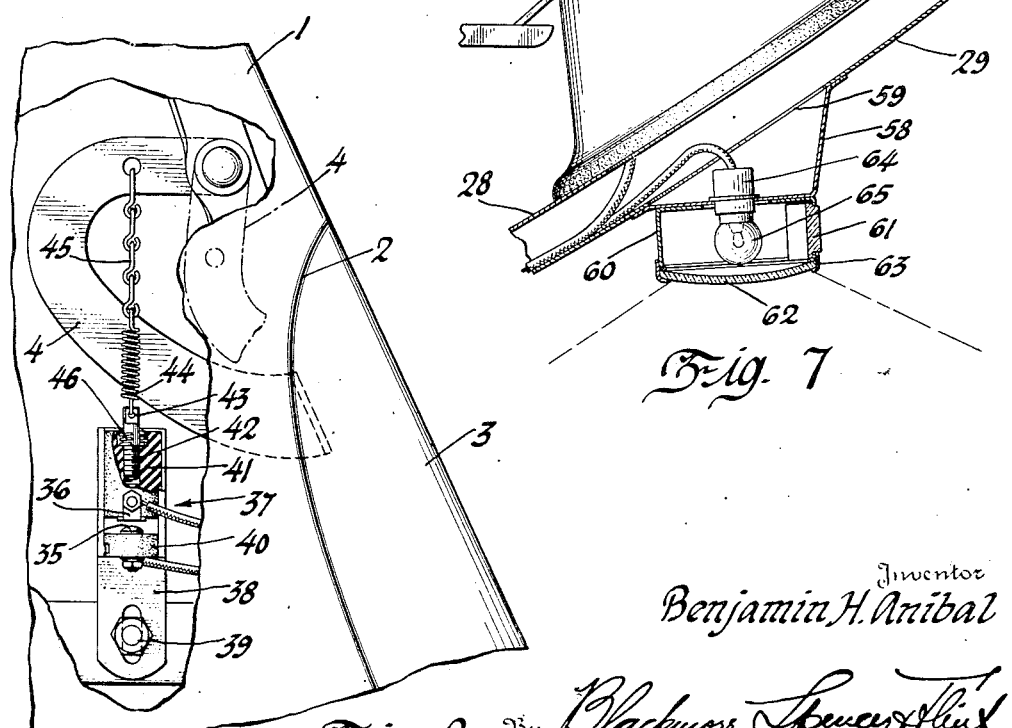
Inventor
Benjamin H. Anibal
By Blackmore, Spencer & Flint
Attorneys

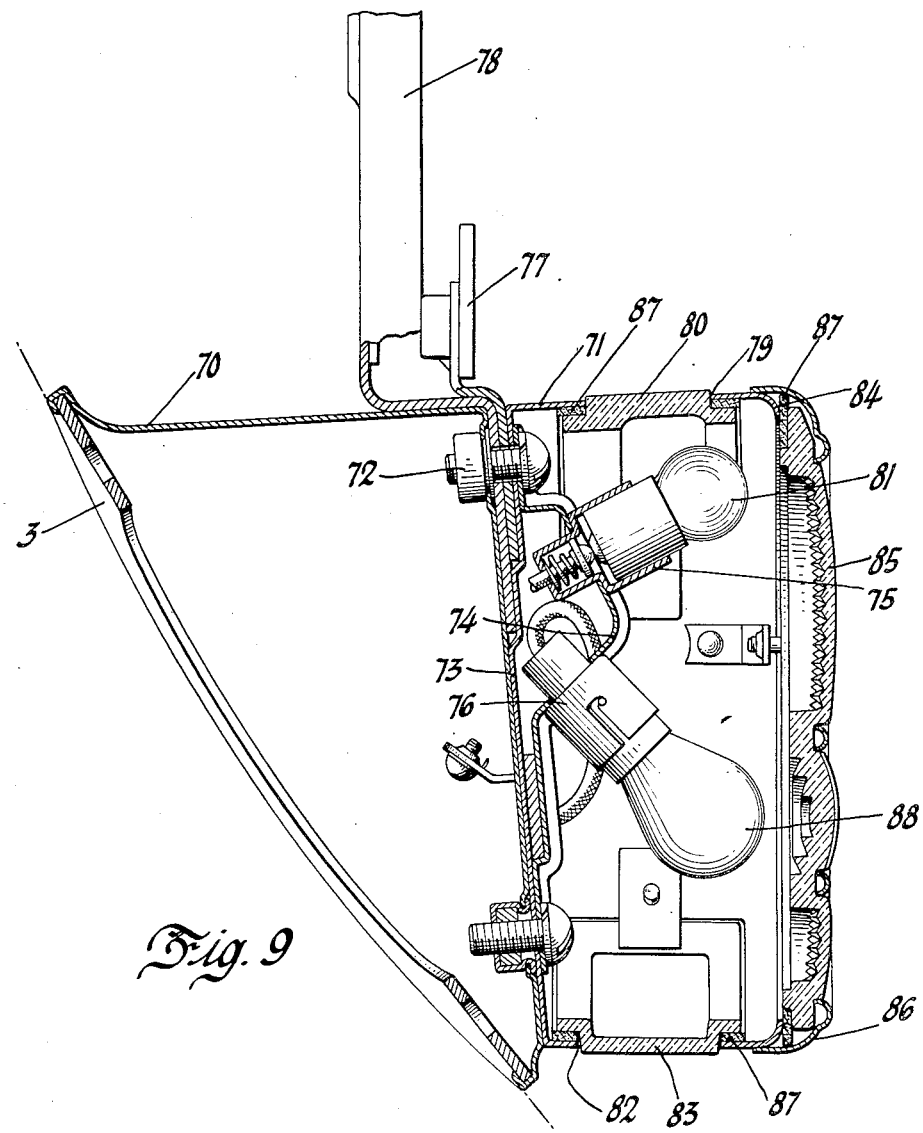

Patented Sept. 22, 1936

2,054,919

UNITED STATES PATENT OFFICE 2,054,919

VEHICLE TAIL LAMP MOUNTING

Benjamin H. Anibal, Pontiac, Mich., assignor to General Motors Corporation, Pontiac, Mich., a corporation of Delaware Application November 5, 1934, Serial No. 751,470

12 Claims. (Cl. 177—329)

This invention relates to lighting structure at the rear of an automotive vehicle, and more specifically to a combination lamp for giving the usual tail and stop light indications at all times as well as including a light for the rear storage compartment when the cover thereof is in its raised position and an auxiliary rear tail light when the storage compartment light is lighted.

In the later model cars it has become general practice to supply in the rear portion of the body a storage space in which the spare wheel and tire are stowed-away and also any desired luggage. A cover is provided for the opening in the body, giving access to the compartment, which is pivoted at the top edge. The usual combination tail and stop light has in some installations been mounted on this cover. However, when it was necessary to change a tire at night the cover would have to be raised to obtain the spare wheel which would direct the tail light substantially vertically instead of horizontally and there would be danger of an accident from cars approaching from the rear. Also with the usual type of construction as outlined above, there would be no light in the compartment to aid the operation in locating various articles.

It is therefore the object of this invention to provide a compound lamp which, as well as giving the usual tail and stop light indications will illuminate the interior of the storage compartment and give an auxiliary tail light to the rear when the cover is in its raised position.

For a better understanding of the nature and objects of my invention, reference is made to the following specification wherein there are described the embodiments of my invention which are illustrated in the accompanying drawings, in which:

Figure 1 is a partial side elevation of a motor car showing the cover of the storage compartment in its raised position.

Figures 2, 3, 4 and 5 are diagrammatic views showing different wiring systems for connecting up the bulbs used in the compound lamp.

Figure 6 is an enlarged sectional view through the lamp, and a portion of the cover to which it is secured.

Figure 7 is a side elevation of a modified form of compound lamp, parts being shown in section.

Figure 8 is an enlarged detail view of the cover hinge and switch actuated thereby, parts being shown in section.

Figure 9 is a vertical sectional view through a modified form of lamp.

A motor car body 1 has an opening 2 in the rear thereof which is covered by a cover or door 3 whose shape conforms to that of the body. The door is rigidly secured at its upper edge to a hinge 4 which is in turn pivoted on a brace within the body. To the lower portion of the door and movable therewith is secured a lamp structure 5 having a bracket 6 carried thereby for supporting the license plate.

Referring to the mechanical structure of the lamp, best shown in Figure 6, a short cylindrical metal body 7 forms the basic structure. One end of the cylinder is closed by a circular disk 8 integral with the body. The opposite end of the cylinder is flanged inwardly as at 9, the central portion being open. A rim 10 supporting a circular lens 11 is secured over the flange 9. This circular lens forms the rear of the lamp in normal closed position of the cover and is of red colored glass. Two diametrically spaced openings are provided in the cylindrical body, one at the top and one at the bottom in which are secured, in conventional manner, two lenses 12 and 13. The lens 12 inserted in the top opening is of plain white glass to illuminate the license plate. The lens 13 in the bottom of the body or casing is of red glass and the light passing through this lens acts as an auxiliary tail light when the cover is in raised position as it will then be pointing horizontally to the rear. In the disk forming the back of the body is a fourth opening in which is secured a lens 14 which is white and whose purpose will be evident as the description proceeds.

A cylindrical casing 15 of the same diameter as the body 7 is secured to the back of the lamp body by bolts 16 which pass through the disk 8 and through a narrow flange 17 on the casing 15. The bolt at the top of the body also clamps the end 18 of the license plate bracket between the flange and the disk 8. The bracket 19 lies parallel with the face of the disk 8 for a portion of its length and is connected thereto by spot welding or the like. Its end is bent at an angle thereto and has two branches 20 and 21 each of which supports a lamp socket 22, one for the small tail lamp 23 and the other below it for the larger stop light lamp 24. Lead wires 25 and 26 connect the lamps 23 and 24 respectively to the outer cable 27 which leads into the car.

The cover 3 is formed of two parallel metal sheets 28 and 29 that have aligned openings 30 and 31 therein. The opposite end of the casing 15 is secured over these openings. The edge of the end of the casing is reversely bent to clamp a ring 32 therein, which ring is secured to the cover by bolts 33. An annular rubber ring 34 surrounds the reversely bent portion of the casing 15 and spaces it from the cover to give a tight quiet joint.

The cable 27 is fed back through the cover and over the hinge 4 to the body where one of its lines is broken and the two ends connected to contacts 35 and 36 of the door switch indicated generally at 37 and shown in Figure 8. This switch is composed of a base 38 secured in a vertical position to a frame member by nut 39 below the hinge 4. The lower contact 35 is fixed rigidly to the base but insulated therefrom by a block 40 of any insulating material such as hard rubber that is fastened to the base. The upper terminal 36 is also set in a hard rubber block 41 but this block is movable relative to the base in a track formed by the two bent over edges of the base. The upper end of the block is drilled and tapped and a stud 42 threaded therein. The outer end of the stud has a small hole 43 for connection with one end of a spring 44, the other end of which is connected to a chain 45 which is in turn fastened to the hinge 4. The end of the base is also upturned to prevent the block 41 from being withdrawn from the track, and the opening in the end of the block is enlarged for a short distance to accommodate a spring 46 coaxially with the stud which bears against the upturned end of the base and the block, and tends to bring the contacts into engagement. It will be seen that when the cover or door is in its closed position, as shown, the spring 44 and chain will pull the movable contact up out of engagement with the fixed lower contact and compresses the spring 46. But when the cover is opened the hinge moves downwardly releasing the tension on the spring 44 and allowing spring 46 to press the contacts together.

The wiring diagram for the two lamps 23 and 24 is shown in Figure 2. The battery 47 of the car, one side of which is grounded, is connected by a wire 48 with the light switch 49, the other side of the switch being connected by wire 50 through the tail lamp to ground, which completes a circuit for the tail lamp through the lighting switch as is the usual construction. A branch wire 51 connects the line 48 with the stop light switch 52 and wire 53 connects the switch through the stop light to ground. A circuit 54, which contains the door switch 37, is connected from line 50 to 53.

The system shown in Figure 3 is substantially the same as Figure 2 except that the circuit 54' which includes the door switch is connected between the line 51 and 53 instead of 50 and 53, and also that a fuse 56 is included in this line.

The operation of the first circuit will be briefly set forth. When the lighting switch is closed and the cover is in its closed position, the tail light will be lit alone by an obvious circuit which will cause light to be sent to the rear through lens 11 and up on the license plate through lens 12. Also when the stop light switch is closed, the stop light will be lit emitting light to the rear through lens 11, down through lens 13 and inwardly through lens 14. The last two, however, will have no function under these circumstances. Now if the cover is raised, the switch 37 will be closed so that when the car lights are turned on the stop light bulb will be illuminated. The light flowing from the lens 14 will then illuminate the storage space and the red light from the lens 13 will act as an auxiliary tail light since the usual tail light is now directed vertically. Therefore, when the car lights are on upon opening the rear cover, the stop light will be energized to illuminate the space and give an auxiliary tail light.

In the modification of the wiring system shown in Figure 3, the stop light will be energized on all openings of the cover regardless of whether the car lights are turned on or not.

A modified form of my invention is illustrated in Figure 7. In this case, a conventional tail and stop light 57 is secured to the face 28 of the cover in any desired manner. To the inner face 29 is secured a bracket 58 by welding directly in line with an opening 59 in the face. Rigidly secured to the bracket is a lamp structure which consists of a cylindrical metal casing 60 having an opening in the periphery for a red lens 61. A white lens 62 is supported on the open cylinder end by a rim 63. A lamp socket 64 is secured in the bracket and projects through the back wall of the casing and supports a bulb 65 within the lamp. Cables from the tail and stop light and the auxiliary light are led back to the body as before.

The wiring diagrams for the modification are shown in Figures 4 and 5.

A battery 47 is grounded as before and the other terminal is connected to both the lighting switch 49 and the stop light switch 52 by wires 66 and 67. A wire 53, as before, connects the lamp 24' with the switch 52 and the other side of the lamp is grounded to complete the circuit. A wire 50 connects the tail lamp 23' with the switch 49 and the other side is also grounded. To the line 50 is connected a circuit 68 in which the door switch 37 is included, which is connected to the compartment lamp 65 and then to ground. In this circuit, as in that shown in Figure 2, the compartment light is energized only when the lighting switch is closed and the cover is raised. If it is desired in this form to have the compartment light lit at any time the cover may be raised regardless of whether the lights of the car are lit, the circuit shown in Figure 5 may be used. Since the compartment light is in this form a separate lamp, a separate circuit which includes only this lamp and the door switch may be used as shown. A fuse 56 is placed in this circuit for protection. This last system has the advantage of being independent from all other electric circuits of the car and if the main lighting and indicating circuits become damaged in any way and it is still necessary to operate the car before they are repaired the top cover may be left in its raised position and the auxiliary light will operate and prevent other cars from colliding with the vehicle. Also in using any of the forms if it is necessary to carry so much that the cover will be left open, the auxiliary tail light will be lit to aid the main tail light dependent upon the position of the cover.

If it is desired to use a more simple and less expensive type, the compartment light may be eliminated and only an auxiliary tail light provided as shown in the modification illustrated in Figure 9. In this, as in the other form, a bracket 70 is secured to the cover 3 in any desired manner. Secured to the rear face of the bracket is a cylindrical casing 71 by bolt 72 through the rear wall 73. Also secured under the bolt heads is an angled bracket 74 which projects into the center of the casing and to which two lamp sockets 75 and 76 are secured. The top bolt also clamps between the rear face of the casing and the bracket 70, an emblem plate 77 and a license bracket 78. The cylindrical portion of the casing has an opening 79 in the top, in which is secured a plain lens 80 through which a tail light bulb 81 in socket 75 illuminates the license plate.

Diametrically opposite the opening 79 is a second opening 82 in the bottom of the casing, in which opening is suitably secured a red lens 83. The front of the casing has an inwardly directed flange 84 around the periphery against which a compound red lens 85 is biased by a snap holding ring 86. A gasket 87 of cork or rubber is placed between the lens and the flange to provide a tight joint.

In the lower socket 76 is secured a stop light bulb 88 which is normally adapted to shine through a portion of the compound lens 85 and the tail light is also adapted to shine through a different part of the lens, both giving the usual tail and stop light indications and being connected to the car circuits in the conventional manner.

In this form of my invention, when the cover is raised at night the tail light 81 will shine through the lower red lens 83 and be directed to the rear of the vehicle and give warning to approaching cars, but there will be no compartment light.

It will therefore be seen that I have provided a compound lamp that is capable of a plurality of lighting and indicating beams with a suitable control circuit through which it will illuminate the storage compartment of a car when the cover is raised and at the same time give an auxiliary rear light, or if a simpler arrangement is desired will give only an auxiliary rear light.

I claim:

1. A compound lighting fixture for the rear of a motor car having a body portion capable of assuming different positions with respect to the body comprising a casing secured to the portion, a plurality of lenses inserted in four faces of the casing, the lenses being of two different colors, a pair of lights supported within the casing, each light capable of sending a beam through at least two lenses, one of each color and means for attaching the casing to the rear of a car whereby different signals are sent out in different positions of the body portion.

2. A signal for the rear of motor cars having a rear storage compartment and a door therefor, means secured to the door to give a plurality of signals to the rear when the door is closed, and a plurality of different signals when the door is in raised position.

3. A combination light for the rear of motor cars having a rear storage compartment and a cover or door therefor, a plurality of light sources secured to the door, means for controlling the sources operated by the cover, a plurality of lens structures for each source at different angular sides whereby the different sources will give different indications when the cover is in different positions.

4. A rear signal and illuminating assembly for a motor car having a rear storage compartment and a cover therefor, means secured to the cover for giving tail and stop light indications, means also secured to the cover for giving an auxiliary tail light and illuminating the storage compartment, said last named means being controlled by a switch operated to different positions by change in position of the cover.

5. A rear signal and illuminating assembly for a motor car having a rear storage compartment and a cover therefor, a combination tail and stop light secured to the outer face of the cover, an auxiliary lamp casing having a plurality of lenses therein secured to the inside face of the cover, and a lamp within the auxiliary casing controlled by a switch operated to different positions by change in position of the cover and capable when the cover is raised to give an auxiliary tail light through one lens and illuminate the storage compartment with the other lens.

6. A compound lighting fixture for use on a motor car having a rear storage compartment and a cover therefor with an opening therein, comprising a cylindrical casing, a lens supported upon one end of the casing, a circular disk closing the other end of the casing, a small opening in the disk in which a second lens is supported, openings in the top and bottom of the cylindrical casing, a third and fourth lens inserted in these openings, a bracket within the casing, two lamps supported on the bracket one above the other, and means to secure the casing upon the cover over the opening whereby normal indications may be given when the cover is in closed position and auxiliary indication and light in the compartment are available when the cover is open.

7. An auxiliary signal and illuminator for use on a vehicle having a rear storage compartment and movable cover therefor, comprising a casing secured to the inner face of the cover, a plurality of lenses mounted in the case, a source of light and means for controlling the source of light actuated by the movement of the cover whereby when the cover is raised the light will light and send out an auxiliary tail light through one lens and illuminate the storage compartment through a second.

8. A signal and illuminator for the rear of vehicles having a rear storage compartment with a cover therefor, means secured to the cover to give tail and stop light indications when the cover is closed, and means to give an auxiliary tail light and illuminate the storage compartment when the cover is in raised position.

9. A signal for the rear of motors cars having a rear compartment and a door therefor, means secured to the door to give signals to the rear when the door is closed, and having additional signalling means effective to give auxiliary signals to the rear when the door is in raised position.

10. A compound lighting fixture for a movable panel at the rear of a motor car comprising a casing secured on the panel, a plurality of lights within the casing, three lenses inserted in different angular positions in the casing of different colors whereby a plurality of different colored signals may be sent out in different positions of the panel.

11. In a signal for the rear of motor cars having a rear compartment and a cover therefor, a light source and lens structure supported by the cover to give signals to the rear when the door is normally closed and an additional light source and lens structure adjacent the first to give auxiliary rearward signals when the cover is open and in a position at substantially right angles to the normal.

12. In a signal for the rear of motor cars having a rear compartment and a hinged cover therefor, a plurality of lights supported by the cover and a plurality of lenses supported in juxtaposition to the lights and at right angles to each other to give tail light indications both when the cover is open and in closed position.

BENJAMIN H. ANIBAL.